Patented Aug. 7, 1945

2,381,148

UNITED STATES PATENT OFFICE

2,381,148
DEHYDRATION OF UNSATURATED ALCOHOLS

Charles Weizmann, London, England

No Drawing. Application April 1, 1943,
Serial No. 481,493

11 Claims. (Cl. 260—681)

The dehydration of 3-substituted 1-butene-3-ols

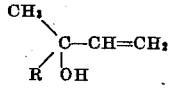

(R being alkyl, aralkyl or aryl) to 2-alkyl-butadienes $CH_2=CR-CH=CH_2$ is a known process and a number of dehydrating agents (e. g. oxalic acid, potassium hydrogen sulphate and activated alumina), have been contemplated as water splitting catalysts for the process. The most important application of the process is the production of isoprene. Obviously, the dehydrating action is not specific for these unsaturated alcohols, certain alcohols present as contaminations, most especially tertiary ones, may also be dehydrated. This is specifically true for the corresponding 3-alkl-butane-3-ols and their homologues, which are the most likely contaminants of the butene-ols and their homologues, as it is known that in the preparation of the latter by catalytic hydrogenation of the 3-alkyl-1-butine-3-ols and their homologues, the reaction is likely to continue to a certain extent to the saturated stage. As a matter of fact, it might be desirable to somewhat over-hydrogenate the acetylene compounds, as any trace of them left in the butene-ols would cause the resulting dienes to contain some substituted vinyl-acetylenes ($CH_2=CR-C\equiv CH$ and homologues), which are considered detrimental to the most important use of the dienes, namely their polymerization in the manufacture of synthetic rubber. In brief, the above method hardly allows the preparation of the pure dienes, if the starting alcohols are not absolutely pure.

I have now found that it is possible to dehydrate the above-defined unsaturated alcohols selectively, and to prepare pure dienes even from their mixtures with the corresponding saturated alcohols. The catalysts required for this purpose are the salts of weak organic bases, preferably aromatic nitrogenous bases, with strong acids, such as anilin hydrobromide $$C_6H_5NH_2.HBr$$

or anilin benzene-sulphonate $$C_6H_5NH_2.C_6H_5SO_3H$$

or o-toluidin o-toluene-sulphonate

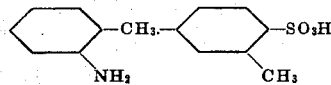

or α naphthylamin p-toluene sulphonate

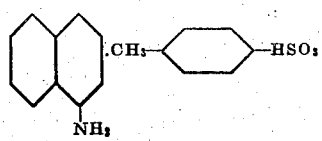

etc. These salts dehydrate the butene-ols and analogous unsaturated alcohols, at their boiling point very quickly, while the saturated alcohols are dehydrated either only very slowly or not at all. The quantities of the dehydrating catalysts required are small, they amount from 2 to 10% by weight of the alcohol. The difference between the unsaturated and saturated alcohols is especially marked if the dehydration is carried out in appropriate solvents having boiling points higher than those of the alcohols. 3-methyl-1-butene-3-ol ($R=CH_3$) is under these circumstances completely dehydrated in a period of time in which 3-methyl-butane-3-ol is hardly attacked at all. Hence, when treating a mixture containing the unsaturated alcohol and saturated alcohol, it is readily possible to selectively dehydrate the unsaturated alcohol, while leaving the saturated alcohol substantially unaltered. Apparently not only the velocity, but also the temperature coefficient of the dehydration is also higher for the unsaturated alcohols. Appropriate solvents or diluents are all those which are not attacked themselves by the above catalytic reagents, and which do not react with the alcohols or with the dehydration products. I have found suitable, as such solvents or diluents, e. g. aromatic hydrocarbons such as toluene, xylene, ethylbenzene, solvent naphtha, ethers such as di-butyl ether, esters, such as butyl acetate, acetals, ketones such as methyl-isobutyl-ketone, in the case of 3-methyl-1-butene-3-ol ($R=CH_3$). Alcohols are in general not suitable, as solvents or diluents.

This process is applicable not only to the specific bodies (unsaturated alcohols) above mentioned, but to the analogous bodies containing substituents in the 1- or 4-positions, or both. The general formula could be accordingly expressed as

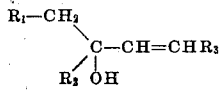

$R^1$, $R^2$ and $R^3$ being hydrogen, alkyl, aralkyl or aryl. Such unsaturated alcohols contain in all cases, an ethylenic linkage.

The affinity of the unsaturated alcohols for the above salts is evidenced by the fact that they dissolve them, even if mixed with such inert solvents as aromatic hydrocarbons. The saturated alcohols have no or a very small solvent power for the salts. If, therefore, a mixture of an unsaturated alcohol of the indicated type with a saturated one and/or with an inert solvent is subjected to the action of the dehydrating catalysts of the kind stated, the salt often precipitates, as soon as the unsaturated alcohol is completely or largely removed.

The recovery of the catalyst is obviously simple. If the water of dehydration distills off with the diene formed, and if no added solvent for the salt is present, the salt remains in solid form. If the water does not distill off, a bottom layer is obtained, consisting of an aqueous solution of the salt.

As the reaction is homogeneous, the speed of the dehydration of the unsaturated alcohols diminishes with the decreasing concentration of said unsaturated alcohols. It is, therefore, often preferable, to add fresh unsaturated alcohol (or a mixture containing this) to the boiling reaction mixture about as fast as that present is dehydrated and the diene distils off.

The above mentioned salts act in this process evidently as a buffered acid and the determining factor for their activity and more specifically for their selective activity is the pH they create in the reactive medium. It is, therefore, sometimes not necessary to use the pure salts of the above defined type but mixtures of the base and the acid in which under certain conditions either the one or the other component might be in slight excess.

I have found that there are other methods which permit distinction between and separation of such alkyl-butene-ols and alkyl-butane-ols. The latter are much more easily acetylated by boiling acetic anhydride than their unsaturated analogs. Thus, 93% of the 3-methyl-butane-3-ol, e. g. was acetylated in 3 hours, while 70% of the corresponding methyl-butenol reacted in the same period. Incidentally, it was observed that the acetyl-derivative of the methyl-butanol formed an azeotropic mixture with the acetic acid formed in the acetylation reaction (constant boiling point 109° C.), while the acetyl derivative of the methyl-butenol boiled at 135° C., with appreciable quantities co-distilling with the acetic acid. The acetyl derivatives can thus easily be isolated and, by saponification, re-converted into the constituent alcohols. The above outlined method has, however, been found greatly preferable.

I have further found that this differential dehydration method in general for the above formulated unsaturated alcohols with their saturated analogs, is very simple and effective. I have further found that the anilin salts of the sulphonic acids, are even more effective than the hydrohaloid salts. I have further found that the method can be improved by use of inert diluents, boiling at higher temperatures than the alcohols, due to the favorable difference in the temperature dependency of the respective reaction velocities.

*Examples*

(1) *Methyl-butenol and methyl butanol.*—70 c. c.=56 g. methyl-butenol (of 80% purity, the other 20% being methyl-butanol), were heated with 5 g. anilin hydrobromide, in a column, mounted with reflux head and an ice-water cooled condenser. Within six hours, the temperature of the boiling liquid rose from 85° to 100° C., while the head temperature was constant at 35° C., and 35.5 g. distillate was obtained. The distillate was identified as pure isoprene, (yield practically 100%). The residue consisted of two layers, the upper one being the unchanged 2-methyl-butanol. The upper layer proved entirely saturated against a bromine solution.

(2) *Methyl-butanol and anilin hydrobromide.*— To 200 c. c.=160 g. methyl-butanol was added 16 g. anilin hydrobromide. These are boiled as above, the temperature being about 100° C. Within 24 hours, 107 c. c.=70 g. oil and 16 c. c. water distilled over, so that only 55% conversion had taken place within this time. The oil was identified as being mainly 2-methyl-butene-, $$CH_2=C(CH_3).CH_2CH_3$$

It is characteristic that this isopentene co-distills with the water formed in the reaction while isoprene leaves most of the water formed behind.

(3) *Reaction in ethylbenzene.*—50 c. c. 3-methyl-1-butene-3-ol (90.3% pure) and 100 c. c. ethylbenzene were heated with 5 g. anilin hydrobromide. The following table illustrates the course of the reaction.

| Time | Bottom temperature | Top temperature | Isoprene, cc. |
|---|---|---|---|
| 0 | 100 | 35 | 0 |
| 50 min | 103 | 35 | 4.5 |
| 100 min | 106 | 35 | 12.0 |
| 140 min | 107 | 35 | 20.0 |
| 220 min | 128 | 35 | 31.5 |
| 255 min | 135 | 35 | 38.5 |
| 300 min | 135 | 35 | 41.0 |

The distillate also contained, after 5 hours, 8 c. c. water. After 5 hours, the anilin salt crystallized suddenly. When the same reaction was carried out with 3-methyl-butane-3-ol, for 21 hours, only 7.5 g. oil and 2.5 c. c. water had formed. In variance with the behavior of the methyl-butenol, the anilin salt did not dissolve in the methyl-butanol.

(4) *Reaction with anilin benzene-sulphonate in xylene.*—50 c. c. 3-methyl-1-butene-3-ol (89% purity) and 5 g. catalyst were added to 50 c. c. xylene and boiled. From the clear solution, which started boiling at 65° C., a quantitative yield of pure isoprene was obtained within 8 hours.

(5) *Reaction in dibutyl ether.*—50 c. c. 3-methyl-1-butene-3-ol (89% purity), 50 c. c. dibutyl ether and 5 g. anilin benzene-sulphonate formed a clear, reddish solution which began to boil at 40° C. During 7 hours, pure isoprene distilled over, 95% of the theory, together with 5 c. c. water.

(6) *Reaction in butyl acetate.*—140 c. c.=104 g. (70% purity) 3-methyl-1-butene-3-ol (containing 30% methyl-butane) were heated with 100 c. c. butyl acetate and 10 g. anilin benzene-sulphonate. Within 5 hours, 84 c. c.=58 g. isoprene (100% yield) and 7 g. water, distilled over. Within the same time, an experiment carried out with 3-methyl-butane-3-ol under the same conditions gave practically no isopentene.

(7) *Reaction of a mixture of 77 g. of 3-methyl-1-butene-3-ol and 87 g. of 3-methyl-butane-3-ol.*—This mixture was boiled with 10 g. anilin benzene-sulphonate. After 6 hours, 37 c. c.=25 g. isoprene had distilled over together with 2 c. c. water. The isoprene was identified in the usual way. Yield, 41.5%. A sample of the residual liquid was distilled off, dried and analyzed. The bromine number had fallen from the initial value of 0.873 g./g. to 0.606 g./g. The concentration of the butenol in the mixture had, therefore, decreased from 47.07 to 32.7%.

The heating was now continued for another 5 hours, during which 19.5 c. c.=12.5 g. isoprene and 2 c. c. water were collected. The yield in isoprene had now risen to 63%; the bromine number of the residual liquid was 0.309 g./g.

There is an important advantage in the treatment of a mixture of the unsaturated alcohol and the saturated alcohol, because many of the processes of producing the unsaturated alcohols of the types herein described, actually produce a mixture of the unsaturated alcohol and saturated alcohol. In using the present process it becomes unnecessary to first separate such mixed alcohols, often a difficult or tedious operation.

I claim:

1. The herein described process of producing a diene which comprises heating together a mixture of a butenol with a butanol while in admixture with a salt of a weak organic nitrogenous base with a strong acid, whereby dehydration is effected selectively in the butenol.

2. Process as in claim 1, in which the said treatment is effected in the presence of an inert organic diluent which is a solvent for the butenol.

3. A process which comprises heating a mixture containing a sulphonic acid salt of an aromatic amine, with an unsaturated monohydric alcohol, in admixture with a saturated monohydric alcohol, sufficiently to cause dehydration of at least a part of said unsaturated alcohol.

4. A process as claimed in claim 3, in which the said materials are reacted in an inert diluent liquid having a boiling point above that of the said unsaturated alcohol.

5. A process which comprises heating a solution containing a sulphonic acid salt of an amine of an aromatic hydrocarbon dissolved in unsaturated alcohol having the formula

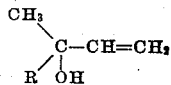

in which R is a radical selected from the group consisting of alkyl, aralkyl and aryl, for a time sufficient to cause dehydration of at least the major part of said alcohol while said alcohol is in admixture with a saturated monohydric alcohol, the latter remaining substantially unaltered during such treatment.

6. A process of selectively dehydrating an unsaturated monohydric alcohol which comprises heating said unsaturated alcohol, in admixture with a saturated monohydric alcohol, in the presence of a salt of an aromatic amine with a strong monohydric acid, until a part at least of the said unsaturated alcohol is dehydrated, while said saturated alcohol remains substantially unaltered.

7. A process as in claim 1, in which there is also present in the reaction mixture, an organic diluent which is inert to the said salt, and which has a boiling point higher than the boiling points of the two alcohols.

8. A process as in claim 1, in which there is also present an aromatic hydrocarbon not attacked by said salt and which hydrocarbon has a boiling point higher than do said alcohols.

9. A process which comprises heating together an alcohol having the structure

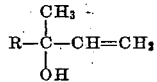

while in admixture with a saturated monohydric alcohol having the same number of carbon atoms, and a sulphonic acid salt of an aromatic amine, sufficiently to dehydrate at least a major part of said first mentioned alcohol.

10. A process which comprises heating together an alcohol having the structure

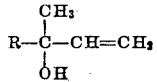

while in admixture with a saturated monohydric alcohol having the same number of carbon atoms, and a hydrohaloid acid salt of an aromatic amine, sufficiently to dehydrate at least a major part of said first mentioned alcohol.

11. A process as in claim 1, in which the said salt used is a monobasic acid salt of an aromatic amine.

CHARLES WEIZMANN.